US012681183B2

(12) United States Patent
Ha et al.

(10) Patent No.: US 12,681,183 B2
(45) Date of Patent: Jul. 14, 2026

(54) EFFICIENT K-NEAREST NEIGHBOR (KNN) METHOD FOR SINGLE-FRAME POINT CLOUD OF LIDAR, AND APPLICATION THEREOF

(71) Applicant: SHANGHAITECH UNIVERSITY, Shanghai (CN)

(72) Inventors: Yajun Ha, Shanghai (CN); Jianzhong Xiao, Shanghai (CN); Hao Sun, Shanghai (CN); Qi Deng, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 252 days.

(21) Appl. No.: 18/387,859

(22) Filed: Nov. 8, 2023

(65) Prior Publication Data

US 2024/0230907 A1 Jul. 11, 2024

Related U.S. Application Data

(63) Continuation of application No. PCT/CN2023/083286, filed on Mar. 23, 2023.

(30) Foreign Application Priority Data

Jan. 6, 2023 (CN) .......................... 202310016208.1

(51) Int. Cl.
*G01S 17/89* (2020.01)
*G06T 7/70* (2017.01)
(52) U.S. Cl.
CPC ................ *G01S 17/89* (2013.01); *G06T 7/70* (2017.01); *G06T 2207/10028* (2013.01); *G06T 2207/20021* (2013.01)

(58) Field of Classification Search
CPC ............................................ G06T 2207/10028
See application file for complete search history.

(56) References Cited

U.S. PATENT DOCUMENTS

| | | | | |
|---|---|---|---|---|
| 2021/0373173 A1* | 12/2021 | Ozaslan | ................ | G01S 17/931 |
| 2024/0230907 A1* | 7/2024 | Xiao | ........................ | G06T 7/70 |
| 2025/0095334 A1* | 3/2025 | Hu | ........................ | G06N 3/0475 |

FOREIGN PATENT DOCUMENTS

| | | | | |
|---|---|---|---|---|
| CN | 111860340 A | 10/2020 | | |
| CN | 112365456 A * | 2/2021 | ............. | G06N 3/045 |

(Continued)

OTHER PUBLICATIONS

Ji Zhang, et al., LOAM: Lidar Odometry and Mapping in Real-time, National Science Foundation, ResearchGate, 2014.

(Continued)

*Primary Examiner* — Gandhi Thirugnanam
(74) *Attorney, Agent, or Firm* — Bayramoglu Law Offices LLC

(57) ABSTRACT

An efficient K-nearest neighbor (KNN) method for a single-frame point cloud of a LiDAR and an application of the efficient KNN method for the single-frame point cloud of the LiDAR are provided, where the efficient KNN method for the single-frame point cloud of the LiDAR is accelerated by a field-programmable gate array (FPGA). In the efficient KNN method for the single-frame point cloud of the LiDAR, a data structure is established based on point cloud projection and a distance scale. The data structure ensures that adjacent points in space are organized in adjacent memories. A new data structure is efficiently constructed. An efficient nearest point search mode is provided.

3 Claims, 3 Drawing Sheets

(56) References Cited

FOREIGN PATENT DOCUMENTS

| | | | | | |
|----|----|----|----|----|----|
| CN | 113538446 A | * | 10/2021 | .......... | G06F 18/241 |
| CN | 113643326 A | | 11/2021 | | |
| CN | 115963471 A | * | 4/2023 | .............. | G01S 7/48 |
| WO | WO-2024146010 A1 | * | 7/2024 | .............. | G01S 7/48 |

OTHER PUBLICATIONS

Tixiao Shan, et al., LeGO-LOAM: Lightweight and Ground-Optimized Lidar Odometry and Mapping on Variable Terrain, 2018 IEEE/RSJ International Conference on Intelligent Robots and Systems (IROS), 2018, pp. 4758-4765.
Reid Pinkham, et al., QuickNN: Memory and Performance Optimization of k-d Tree Based Nearest Neighbor Search for 3D Point Clouds, 2020 IEEE International Symposium on High Performance Computer Architecture (HPCA), 2020, pp. 180-192.
Atsutake Kosuge, et al., An SoC-FPGA-Based Iterative-Closest-Point Accelerator Enabling Faster Picking Robots, IEEE Transactions on Industrial Electronics, 2020.
Hao Sun, et al., Efficient FPGA Implementation of K-Nearest-Neighbor Search Algorithm for 3D Lidar Localization and Mapping in Smart Vehicles, IEEE Transactions on Circuits and Systems II: Express Briefs, 2020, pp. 1-5.
Alexander Carballo, et al., LIBRE: The Multiple 3D LiDAR Dataset, 2020 IEEE Intelligent Vehicles Symposium (IV), 2020, pp. 1094-1101.
Michael Greenspan, et al., Approximate K-D Tree Search for Efficient ICP, Proceedings of the Fourth International Conference on 3-D Digital Imaging and Modeling (3DIM'03), 2003, IEEE Computer Society.
Zonghui Li, et al., Fully Parallel Kd-Tree Construction for Real-Time Ray Tracing, I3D, 2014, pp. 159.
Xingyu Liu, et al., FastTree: A Hardware KD-Tree Construction Acceleration Engine for Real-Time Ray Tracing, 2015 Design, Automation & Test in Europe Conference & Exhibition (Date), 2015, pp. 1595-1598.
Wang Zong-Yue, et al., k-Nearest Neighbors Algorithm for Large Scale Point Clouds Data with Multi-Core CPU, Journal of Geomatics Science and Technology, 2010, pp. 46-49, vol. 27, No. 1.
Yang Rong-Hao, et al., A method of closest points searching based on grid partition, Science of Surveying and Mapping, 2012, pp. 90-93, vol. 37, No. 5.
Ming Yang, et al., CUDA-based kNN Query Algorithm for Massive Point Cloud Data, Bulletin of Surveying and Mapping, 2012, pp. 394-398.

* cited by examiner

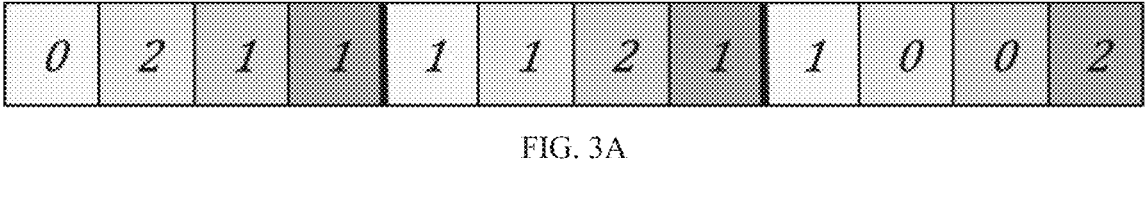
FIG. 3A
FIG. 3B
FIG. 3C

EFFICIENT K-NEAREST NEIGHBOR (KNN) METHOD FOR SINGLE-FRAME POINT CLOUD OF LIDAR, AND APPLICATION THEREOF

CROSS REFERENCE TO THE RELATED APPLICATIONS

This application is the continuation application of International Application No. PCT/CN2023/083286, filed on Mar. 23, 2023, which is based upon and claims priority to Chinese Patent Application No. 202310016208.1, filed on Jan. 6, 2023, the entire contents of which are incorporated herein by reference.

TECHNICAL FIELD

The present disclosure relates to an efficient K-nearest neighbor (KNN) method for a single-frame point cloud of a LiDAR, and an implementation thereof on a field-programmable gate array (FPGA).

BACKGROUND

KNN search is to find K points closest to a target point from a reference point cloud. In intelligent driving technologies, the KNN algorithm is widely used in object detection, positioning, mapping, and other aspects[1]-[2]. Generally, the KNN algorithm is divided into two parts: establishing an efficient data structure and creating a fast search mode. Although existing algorithms have optimized the KNN algorithm in terms of search[3-5], an operating speed is still not sufficient to meet a high-speed driving scenario in intelligent driving. In addition, with the development of LiDAR technologies, a size of a point cloud has multiplied [6], causing the KNN algorithm to consume more time. Therefore, it is crucial to efficiently implement the KNN algorithm.

In the prior art, the above issues have been explored from different directions. As the most widely used KNN algorithm at present, the KD-tree algorithm [7] uniquely proposes a tree-like structure. The KD-tree algorithm first divides space, and then performs comparison to obtain a tree-like node of a candidate point. However, the KD-tree algorithm needs to perform comparison constantly to obtain a division boundary, which consumes a lot of time and results in a long time for creating a data structure. Even though the KD-tree algorithm is optimized in terms of establishment, search, and power consumption in the documents [3] [8] [9], establishment time still cannot meet a high-speed scenario. In the document [5], a new data structure DSVS is proposed. The data structure has been improved in terms of the establishment and search compared with existing data structures, but its energy efficiency is not ideal on a graphics processing unit (GPU) platform.

CITED REFERENCES

[1] Zhang, Ji, and Sanjiv Singh. "LOAM: Lidar odometry and mapping in real-time." Robotics: Science and Systems. Vol. 2. No. 9. 2014.

[2] Shan, Tixiao, and Brendan Englot. "Lego-loam: Lightweight and ground-optimized lidar odometry and mapping on variable terrain." 2018 IEEE/RSJ International Conference on Intelligent Robots and Systems (IROS). IEEE, 2018.

[3] Pinkham, Reid, Shuqing Zeng, and Zhengya Zhang. "Quicknn: Memory and performance optimization of kd tree based nearest neighbor search for 3d point clouds." 2020 IEEE International Symposium on High Performance Computer Architecture (HPCA). IEEE, 2020.

[4] Kosuge, Atsutake, et al. "An SoC-FPGA-based iterative-closest-point accelerator enabling faster picking robots." IEEE Transactions on Industrial Electronics 68.4 (2020): 3567-3576.

[5] Sun, Hao, et al. "Efficient FPGA implementation of K-nearest-neighbor search algorithm for 3D LIDAR localization and mapping in smart vehicles." IEEE Transactions on Circuits and Systems II: Express Briefs 67.9 (2020): 1644-1648.

[6] Carballo, Alexander, et al. "LIBRE: The multiple 3d lidar dataset." 2020 IEEE Intelligent Vehicles Symposium (IV). IEEE, 2020.

[7] Greenspan, Michael, and Mike Yurick. "Approximate kd tree search for efficient ICP." Fourth International Conference on 3-D Digital Imaging and Modeling, 2003. 3DIM 2003. Proceedings. IEEE, 2003.

[8] Li, Zonghui, Tong Wang, and Yangdong Deng. "Fully parallel kd-tree construction for real-time ray tracing." Proceedings of the 18th meeting of the ACM SIGGRAPH Symposium on Interactive 3D Graphics and Games. 2014.

[9] Liu, Xingyu, et al. "FastTree: A hardware KD-tree construction acceleration engine for real-time ray tracing." 2015 Design, Automation & Test in Europe Conference & Exhibition (DATE). IEEE, 2015.

SUMMARY

The present disclosure is intended to efficiently implement a KNN algorithm.

To achieve the foregoing objective, a technical solution in the present disclosure provides an efficient KNN method for a single-frame point cloud of a LIDAR, including the following steps:

step 1: obtaining unordered point cloud data by using the LiDAR, and projecting any point (x, y, z) onto a matrix based on horizontal and vertical resolution of the LiDAR, where a horizontal coordinate of the point (x, y, z) in the matrix is calculated according to $h=\arctan(y/x)/\Delta\beta$, a vertical coordinate of the point (x, y, z) in the matrix is calculated according to $v=\arctan(z/\sqrt{x^2+y^2})/\Delta\alpha$, $\Delta\beta$ represents horizontal angular resolution of the LiDAR, and $\Delta\alpha$ represents vertical angular resolution of the LiDAR;

step 2: calculating a distance r from the point (x, y, z) to the LiDAR, and determining a corresponding distance dimension for the point (x, y, z) based on the distance r and a distance range corresponding to different predetermined distance dimensions;

step 3: dividing each column of the matrix obtained in step 1 into $N_p$ data blocks;

step 4: based on a distance dimension, calculated in step 2, corresponding to each point in each data block, obtaining a quantity of points on each distance dimension in each data block in the matrix, and recording the quantity in a statistical table;

step 5: obtaining an index position of a first point on each distance dimension in different data blocks based on the statistical table obtained in step 4, to obtain an index table;

step 6: rearranging all points based on the index table obtained in step 5 to obtain ordered point cloud data; and step 7: for a target point $p(x_p, y_p, z_p)$ in a same space, finding K adjacent points of the target point from the ordered point cloud data obtained in step 6, which includes the following substeps:

step 701: determining positions vg and hg of the target point $p(x_p, y_p, z_p)$ in the matrix by using the method recorded in step 1, and determining a distance $r_q$ between the target point $p(x_p, y_p, z_p)$ and the LiDAR by using the method recorded in step 2;

step 702: narrowing a search region based on a target range, where a size of a narrowed matrix is $[v_q \pm \arcsin(r_{in}/r_q)/\Delta\alpha, h_q \pm \arcsin(r_{in}/r_q)/\Delta\beta]$, a range on the distance dimension is $R_q \pm R_{in}$, $r_{in}$ represents the search region, Ra represents a distance dimension of the target point p, and $R_{in}$ represents a distance dimension corresponding to $r_{in}$; and step 703: obtaining candidate points of a narrowed region, and calculating and sorting Euclidean distances between all the candidate points and the target point to obtain K nearest points.

Preferably, in step 2, the distance r from the point (x, y, z) to the LiDAR is calculated according to a following formula: $r = \sqrt{x^2 + y^2 + z^2}$.

Another technical solution of the present disclosure provides an application of the efficient KNN method for a single-frame point cloud of a LIDAR, where the efficient KNN method for a single-frame point cloud of a LIDAR is accelerated by an FPGA.

Compared with the prior art, the present disclosure has following innovative points:

(1) Data structure based on point cloud projection and a distance scale. A reference point cloud is reorganized into a new set of point clouds based on a projection position and a distance from a radar, and an index array is obtained, such that a new data structure in this method is formed. The data structure ensures that adjacent points in space are organized in adjacent memories.

(2) The new data structure is efficiently constructed. In a projection process, this method does not use a conventional calculation method, but establishes a lookup table based on a characteristic of a laser point cloud Efficient projection is achieved by replacing calculation with comparison. In addition, this method partitions a projection matrix and achieves parallel construction of the new data structure.

(3) Efficient nearest point search mode. Based on the new data structure, a search region is narrowed based on a target search region. Then, a dynamic cache is created to store a candidate point for parallel calculation.

BRIEF DESCRIPTION OF THE DRAWINGS

FIG. 2A illustrates a projection matrix, FIG. 2B illustrates a top view of a point cloud, and FIG. 2C illustrates distance dimension division; and FIG. 3A to FIG. 3C illustrate an obtained data structure, where FIG. 3A illustrates point counting in a same distance dimension, FIG. 3B illustrates an index table in the data structure, and FIG. 3C illustrates point cloud rearrangement.

DETAILED DESCRIPTION OF THE EMBODIMENTS

The present disclosure will be further described below with reference to specific embodiments. It should be understood that these embodiments are only intended to describe the present disclosure, rather than to limit the scope of the present disclosure. In addition, it should be understood that various changes and modifications may be made on the present disclosure by those skilled in the art after reading the content of the present disclosure, and these equivalent forms also fall within the scope defined by the appended claims of the present disclosure.

Figure 1:
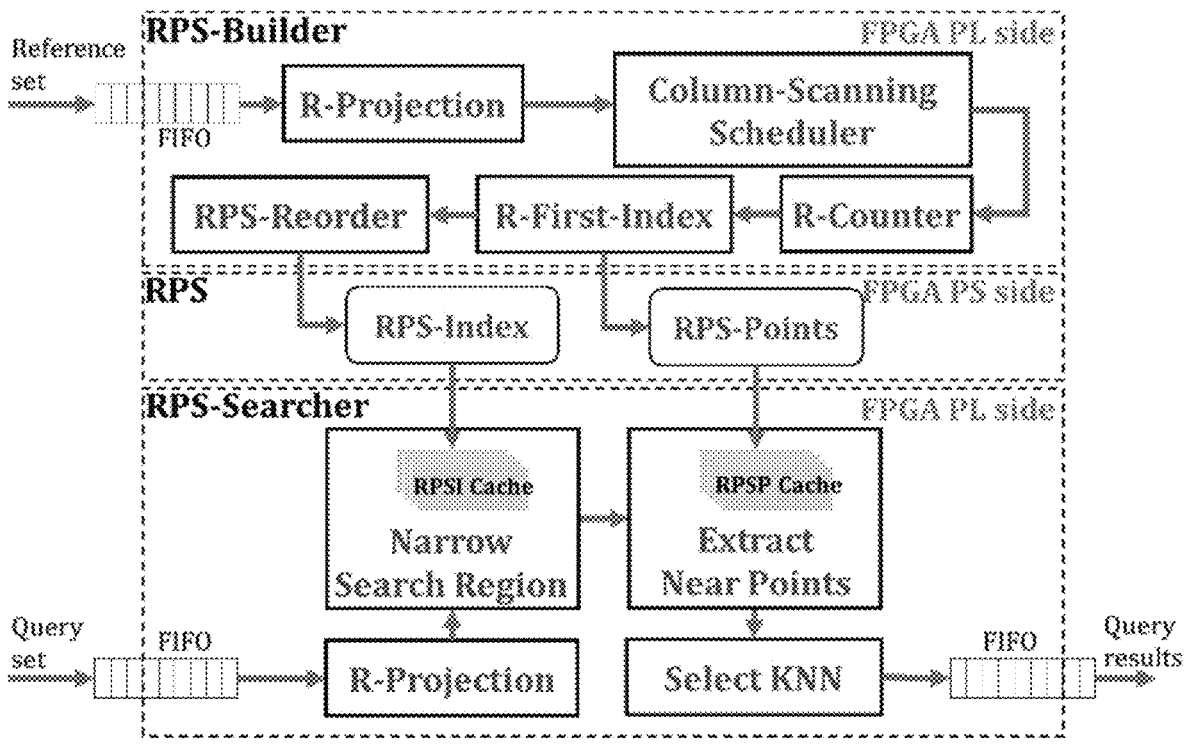
FIG. 1 is an overall block diagram of a KNN accelerator according to an embodiment.
Figure 2A:
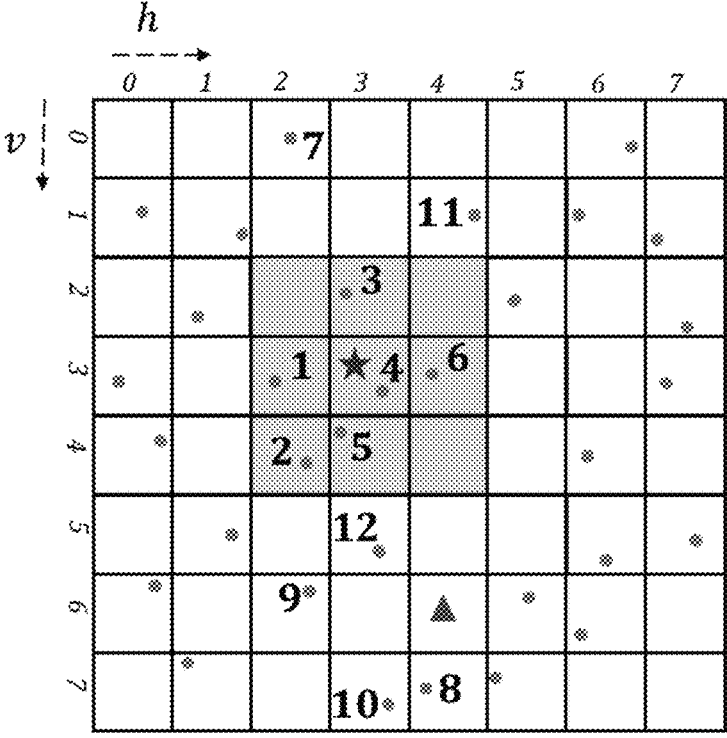
FIG. 2A to FIG. 2C illustrate construction of a data structure, where

An efficient KNN method for a single-frame point cloud of a LiDAR in an embodiment includes the following steps:

Step 1: Unordered point cloud data is obtained by using the LiDAR, and any point (x, y, z) is projected onto a matrix based on horizontal and vertical resolution of the LiDAR, as shown in FIG. 2A. A horizontal coordinate of the point (x, y, z) in the matrix is calculated according to $h = \arctan(y/x)/\Delta\beta$, and a vertical coordinate of the point (x, y, z) in the matrix is calculated according to $v = \arctan(z/\sqrt{x^2 + y^2})/\Delta\alpha$, where $\Delta\beta$ represents horizontal angular resolution of the LiDAR, and $\Delta\alpha$ represents vertical angular resolution of the LiDAR.

Figure 2B:
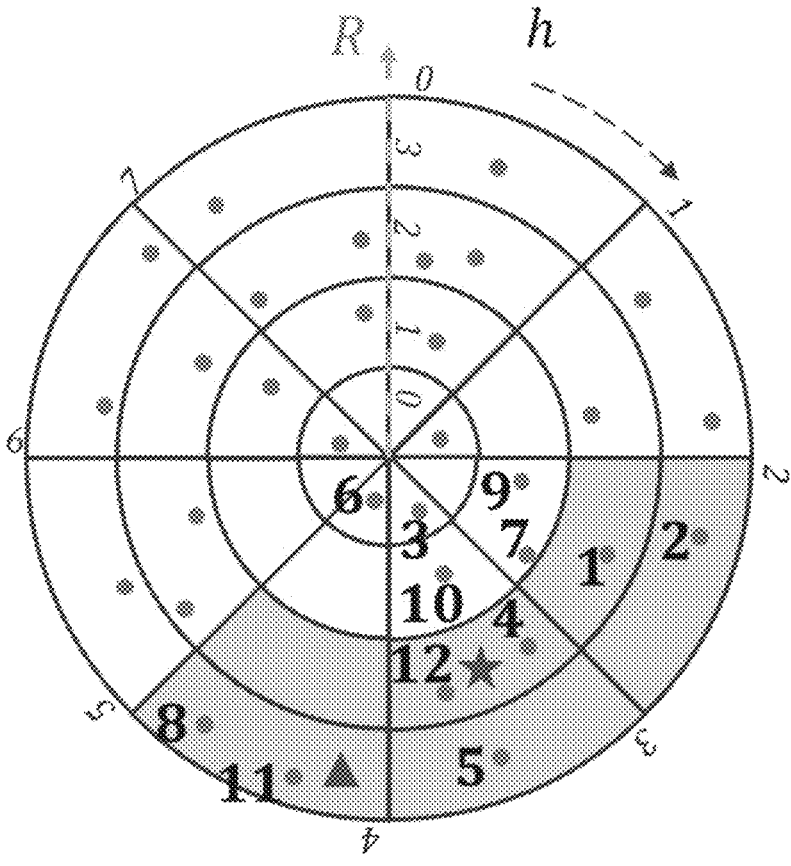
Figure 2C:
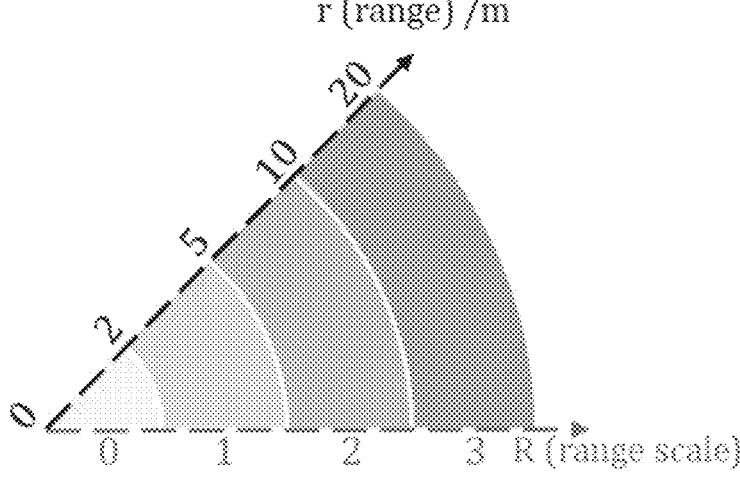

Step 2: Distance $r = \sqrt{x^2 + y^2 + z^2}$ from the point (x, y, z) to the LIDAR is calculated, and a corresponding distance dimension is determined for the point (x, y, z) based on the distance r and a distance range corresponding to different predetermined distance dimensions, as shown in FIG. 2B and FIG. 2C.

Step 3: Each column of the matrix obtained in step 1 is divided into $N_p$ data blocks.

Step 4: Based on a distance dimension, calculated in step 2, corresponding to each point in each data block, a quantity of points on each distance dimension in each data block in the matrix is obtained and recorded in a statistical table. The statistical table records quantities of points on different distance dimensions in different data blocks, as shown in FIG. 3A.

Step 5: An index position of a first point on each distance dimension in different data blocks is obtained based on the statistical table obtained in step 4, to obtain an index table, as shown in FIG. 3B. In this embodiment, if there are a plurality of points on a same distance dimension in a same data block, any of the plurality of points is determined as the first point, or a first received point in the plurality of points may be determined as the first point.

Step 6: All points are rearranged based on the index table obtained in step 5 to obtain ordered point cloud data, as shown in FIG. 3C, such that adjacent points in space are organized in adjacent memories.

Step 7: For target point $p(x_p, y_p, z_p)$ in a same space, K adjacent points of the target point are found from the ordered point cloud data obtained in step 6, which includes the following substeps:

Step 701: Positions $v_q$ and $h_q$ of the target point $p(x_p, y_p, z_p)$ in the matrix are determined by using the method recorded in step 1, and distance $r_q$ between the target point $p(x_p, y_p, z_p)$ and the LiDAR is determined by using the method recorded in step 2.

Step 702. A search region is narrowed based on a target range, where a size of a narrowed matrix is [$v_q \pm$arcsin $(r_{in}/r_q)/\Delta\alpha$, $h_q \pm$arcsin$(r_{in}/r_q)/\Delta\beta$], a range on the distance dimension is $R_q \pm R_{in}$, $r_{in}$ represents the search region, $R_q$ represents a distance dimension of the target point p, and $R_{in}$ represents a distance dimension corresponding to $r_{in}$.

Step 703: Candidate points of a narrowed region are obtained, and Euclidean distances between all the candidate points and the target point are calculated and sorted to obtain K nearest points The above method can be applied to positioning and mapping based on a point cloud of the LiDAR in unmanned driving, and can quickly complete a nearest search task in a single-frame point cloud. In addition, acceleration by an FPGA makes the above method have better real-time performance and consume less energy.

What is claimed is:

1. An efficient method of reconstructing an ordered point-cloud dataset for a single-frame point cloud of a LiDAR, executed by a KNN accelerator implemented on an FPGA comprising a projection module, a column-scanning scheduler, and an index-table memory, comprising the following steps:

step 1: obtaining unordered point cloud data by using the LiDAR, and projecting a point (x, y, z) onto a matrix based on horizontal and vertical resolution of the LiDAR, wherein a horizontal coordinate of the point (x, y, z) in the matrix is calculated according to h=arctan $(y/x)/\Delta\beta$, a vertical coordinate of the point (x, y, z) in the matrix is calculated according to v=arctan(z/$\sqrt{x^2+y^2}$)/$\Delta\alpha$, $\Delta\beta$ represents horizontal angular resolution of the LiDAR, and $\Delta\alpha$ represents vertical angular resolution of the LiDAR;

step 2: calculating a distance r from the point (x, y, z) to the LiDAR, and determining a corresponding distance dimension for the point (x, y, z) based on the distance r and a distance range corresponding to different predetermined distance dimensions;

step 3: dividing each column of the matrix obtained in step 1 into $N_p$ data blocks, where $N_p$ is a positive integer;

step 4: based on the distance dimension, calculated in step 2, corresponding to each point in each data block, obtaining a quantity of points on each distance dimension in each data block in the matrix, and recording the quantity in a statistical table;

step 5: obtaining an index position of a first point on each distance dimension in different data blocks based on the statistical table obtained in step 4, to obtain an index table stored in the index-table memory;

step 6: rearranging all points of the point-cloud based on the index table obtained in step 5 to obtain ordered point cloud data, such that adjacent points in space are organized in adjacent memories.

2. The method according to claim 1, further comprising:

step 7: for a target point p($x_p$, $y_p$, $z_p$) in a same space, finding K adjacent points of the target point from the ordered point cloud data obtained in step 6, which comprises the following substeps:

step 701: determining positions $v_q$ and $h_q$ of the target point p($x_p$, $y_p$, $z_p$) in the matrix according to $$h_q = \arctan\left(y_p/x_p\right)/\Delta\beta \text{ and } v_q = \arctan\left(z_p/\sqrt{x_p^2 + y_p^2}\right)/\Delta\alpha,$$

and determining a distance $$r_q = \sqrt{x_p^2 + y_p^2 + z_p^2};$$

step 702: narrowing a search region based on a target range, wherein a size of a narrowed matrix is [$v_q \pm$arcsin $r_{in}/r_q)/\Delta\alpha$, $h_q \pm$arcsin($r_{in}/r_q)/\Delta\beta$], a range on the distance dimension is $R_q \pm R_{in}$, $r_{in}$ represents the search region, $R_q$ represents a distance dimension of the target point p, and $R_{in}$ represents a distance dimension corresponding to $r_{in}$; and step 703: obtaining candidate points of a narrowed region, and calculating and sorting Euclidean distances between all the candidate points and the target point using the KNN selection module to obtain K nearest points.

3. The method of claim 1, wherein the FPGA comprises FIFO interfaces to receive a reference set and a query set.

* * * * *